Figure 1:
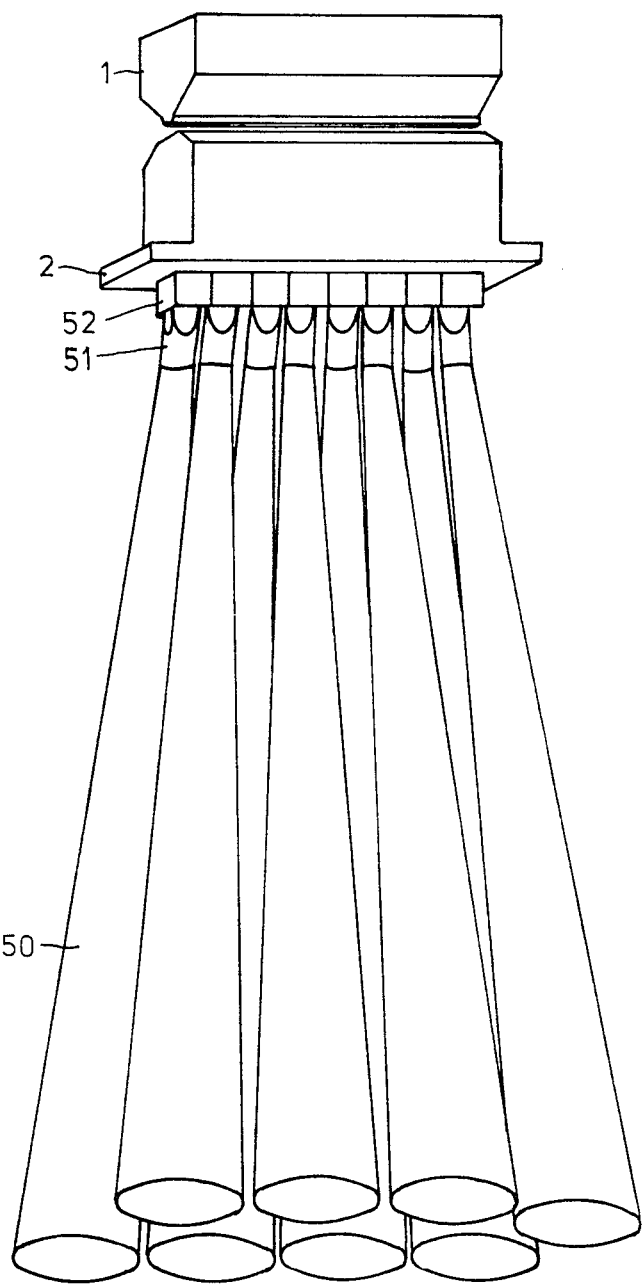

United States Patent [19]

Muschelknautz et al.

[11] Patent Number: 4,553,996
[45] Date of Patent: Nov. 19, 1985

[54] PROCESS FOR PRODUCING MINERAL WOOL FIBERS WHILE REDUCING THE VELOCITY OF FLOWING MEDIA

[75] Inventors: Edgar Muschelknautz, Leverkusen; Norbert Rink, Rommerskirchen; Georg Chalupka, Odenthal, all of Fed. Rep. of Germany

[73] Assignee: Bayer Aktiengesellschaft, Leverkusen, Fed. Rep. of Germany

[21] Appl. No.: 589,450

[22] Filed: Mar. 14, 1984

[30] Foreign Application Priority Data

Mar. 19, 1983 [DE] Fed. Rep. of Germany ....... 3309989

[51] Int. Cl.$^4$ ............................................. C03B 37/06
[52] U.S. Cl. ............................................. 65/4.4; 65/5; 65/9; 65/16; 264/12; 425/7; 425/80.1
[58] Field of Search ............................ 65/4.4, 5, 9, 16; 425/80.1, 7; 264/12

[56] References Cited

U.S. PATENT DOCUMENTS

| | | | |
|---|---|---|---|
| 4,052,183 | 10/1977 | Levecque et al. | 65/5 X |
| 4,337,074 | 6/1982 | Muschelknautz et al. | 65/5 |
| 4,343,639 | 8/1982 | Muschelknautz et al. | 65/4.4 |
| 4,478,624 | 10/1984 | Battigelli et al. | 65/4.4 |
| 4,487,622 | 12/1984 | Battigelli et al. | 65/4.4 |

Primary Examiner—Robert Lindsay
Attorney, Agent, or Firm—Sprung, Horn, Kramer & Woods

[57] ABSTRACT

A method for the reduction of the velocity of dispersions of fine particles in gas is described, in which the dispersion is divided into a plurality of mass flows M which are conveyed each to a subsonic diffuser to reduce the velocity from $V_1$ to $V_2$, wherein the product of mass flow M and density velocity ration $S_1 V_1/S_2 V_2$ is less than 10 kg/sec.

The method is particularly useful in the manufacture of mineral wool, where the mineral wool fibers are first obtained being dispersed in a high velocity gas stream.

7 Claims, 6 Drawing Figures

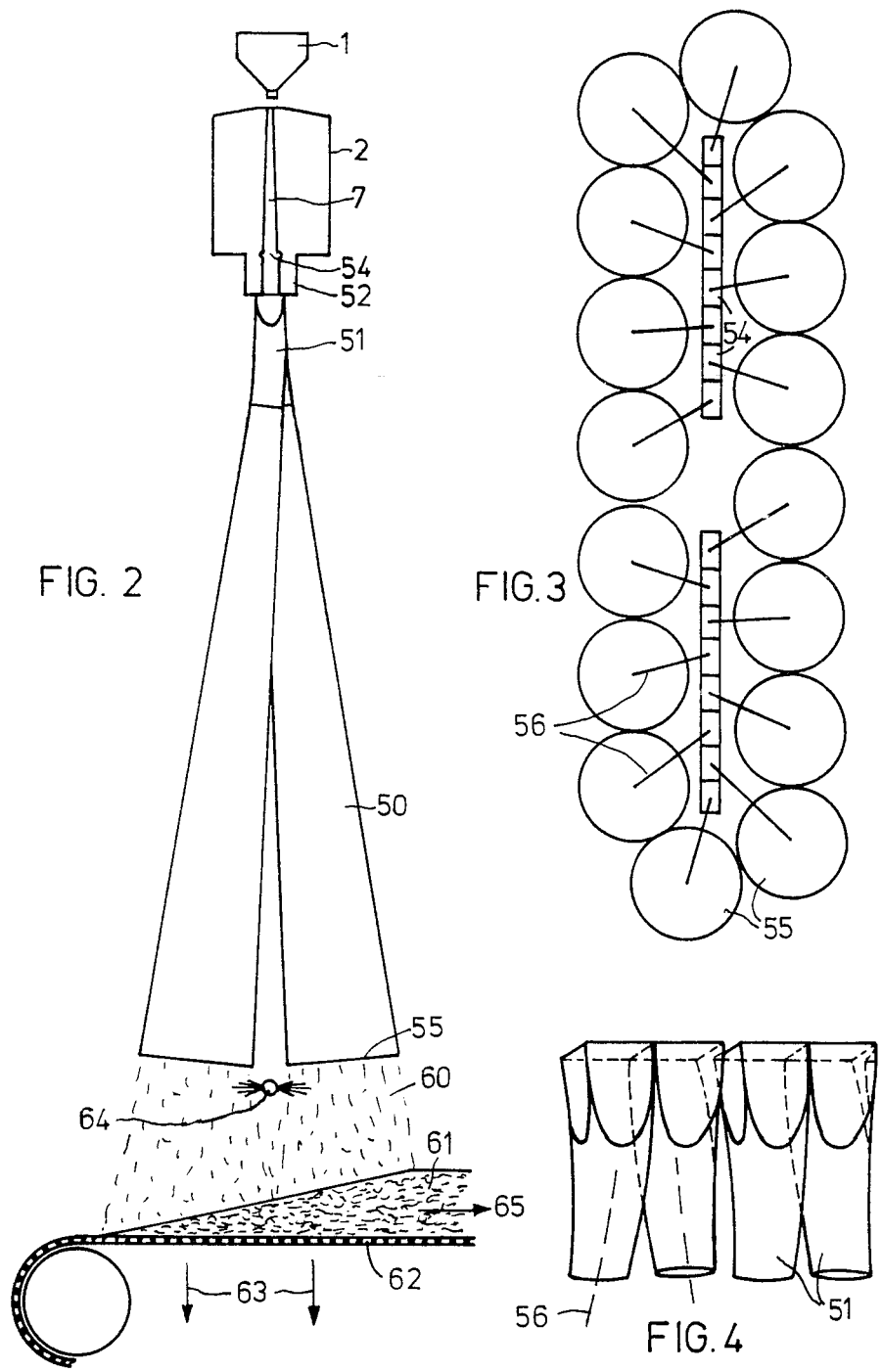

PROCESS FOR PRODUCING MINERAL WOOL FIBERS WHILE REDUCING THE VELOCITY OF FLOWING MEDIA

The present invention relates to a process and to an apparatus for reducing the velocity of flowing media, in particular, the velocity of solid particles/gas dispersions in a subsonic diffuser. The present invention was specifically developed with a view to the production of fibre mats from fibres of mineral wool.

In the production of mineral wool, the fibres are generally formed by one-stage or multi-stage separation of a material into fibres, the last stage of which generally consists of an aerodynamic drawing-out process. Thus fibres are obtained in the form of a fibre-gas dispersion, the dispersion having a high linear velocity, of more than 100 m/s up to the velocity of sound. Fibre mats are then produced by depositing the fibres on a perforated conveyor belt, the gas being drawn off by suction below the conveyor belt. The velocity of the fibre/gas dispersion must be reduced to the velocity of the gas which passes through the conveyor belt before the fibres may be deposited on the conveyor belt.

A series of processes are already known for reducing the velocity of the dispersion.

According to a series of prior art proposals the fibre/gas dispersion is introduced into a flow channel which has a relatively large opening, through which ambient air is drawn in by suction and, in addition, the flow channel has a length which enables the fibre/gas dispersion to mix with the ambient air, thus producing an average velocity which is between the initial velocity of the fibre/gas dispersion and of the ambient air which has been drawn in by suction.

According to other proposals, the flow channel consists of a diffuser, into which ambient air is additionally drawn in by suction at various stages in the direction of flow.

Other processes are based on the fact that the fibre/gas dispersion which has a high velocity is simply released into the atmosphere, the dispersion being checked on mixing with the ambient air. At this point a subsonic diffuser may optionally be connected upstream.

These known processes, which necessitate dilution of the dispersion with stationary gas to reduce its velocity, suffer from the disadvantage that the quantity of gas which has to be drawn off by suction below the conveyor belt is substantially increased. This increased volume of gas cannot simply be released into the atmosphere and has to be treated since it generally contains small drops of binder and finely-divided dust particles resulting from the production of the fibres.

The power for pumping this increased volume of gas through filters and washers unfavourably overloads the process.

The production of fibre mats which have a small density necessitates even in the fibredepositing stage, the production of raw densities which are as small as possible. The necessity of drawing off large volumes of gas by suction through the conveyor belt and through the fibre mat which has already been formed, also implies that the drop in pressure caused by the fibre mat is correspondingly large and hinders the production of small raw densities.

Thus, an object of the present invention is to reduce the velocity of fibre/gas dispersions without diluting the dispersion.

This is carried out, according to the present invention, in subsonic diffusers. The mode of operation of subsonic diffusers is known in principle. The ratio of the inlet and outlet density velocity is determined by the ratio of the cross-section of the inlet to the cross-section of the outlet. The wall of the diffuser absorbs the momentum difference of the flowing medium. The reduction in velocity near the wall of the diffuser is thus considerably greater than at the axis of the diffuser. Thus, a velocity profile becomes apparent. If the ratio of the cross-section at the inlet to the cross section at the outlet of the diffuser is relatively large, then there can be no substantial interaction between the flow at the axis of the diffuser and the flow at the wall of the diffuser. This therefore results in backflows between the wall and the axis of the diffuser. This may be prevented, in principle, by prolonging the period of residence of the flowing medium in the diffuser such that the velocity is still adequately balanced out over the cross section of the diffuser. A prolonged residence period of this type is achieved by extending the diffusor in the direction of the axis, that is by means of a very small diffuser aperture angle. In the case of high density velocity ratios of, for example, 30, diffusor lengths in the axial direction of 10 m or more result, which are technically very expenditive.

It has now been found that by using a plurality of small diffusers, despite reducing the residence period of the flowing medium in the diffuser, high density velocity ratios may be controlled, without backflows being produced.

An object of the present invention is thus to provide a process for reducing the velocity of a flowing medium in a subsonic diffusor, which is characterised in that the mass flow $\dot{M}$ through the diffusor is selected such that the product $$\dot{M}\frac{\rho_1 V_1}{\rho\delta_2 V_2}$$

is smaller than 10 kg/s, $\rho_1 V_1$ denoting the average density velocity at the inlet of the diffuser $\rho_2 V_2$ denoting the average density velocity at the outlet of the diffuser.

Density velocity denotes the product of density $\rho$ and velocity $V$ of the dispersion.

The ratio $$\dot{M}\frac{\rho_1 V_1}{\rho\delta_2 V_2}$$

should preferably be less than 8.5 kg/s, and more preferably, be in the range of from 5 to 8 kg/s.

Flow channels having an extension angle of from 3.5° to 7° are preferably used as diffusers employed in the present invention.

The flow channels should preferably have an oval cross section, the ratio of the largest diameter to the smallest diameter being less than 2. More preferably, channels having a circular cross-section are used. Should the cross section not be circular in shape, it should preferably be elliptical in shape.

It is possible to control density velocity ratios of more than 30 between the inlet and outlet of the diffuser by means of the process according to the present invention.

The density velocity ratios should preferably be in the range of from 50 to 200.

The density velocity of fibre/gas dispersions, which result during the production of mineral wool on the fibre formation apparatus, may be more than 100 kg/sec·m². The initial density velocities which are used at the inlet of the diffuser, according to the present invention should preferably be in the range of from 150 to 300 kg/s·m², and, more preferably, be more than 200 kg/s·m².

The outlet density velocities according to the present invention should preferably be less than 6 kg/s·m². Outlet density velocities which are particularly preferred are in the range of from 1 to 4 kg/s·m².

In commercial processes for separating a material into fibres, such as in the nozzle blasting process, a mass flow of fibre/air dispersion is produced on a fibre formation unit, a mass flow which by far surpasses the mass flow supplied to a diffuser, according to the present invention. Thus, according to the present invention, the fibre/gas dispersion is divided into individual mass flows Ṁ which correspond to $$\dot{M} \frac{\rho_1 V_1}{\rho_2 V_2}$$

being less than 10 kg per second, in accordance with the initial density velocity $\rho_1 V_1$ thereof and the desired final density velocity $\rho_2 V_2$, and each mass flow is separately supplied to a diffusor. The fibre formation unit, such as the drawing nozzle in the nozzle blasting process, is more preferably divided into segments, each segment producing a mass flow Ṁ of fibre/gas dispersion, which complies with the conditions to be observed, according to the present invention.

Although the process, according to the present invention, was specifically developed for the production of fibre mats, it may be advantageously used wherever dispersions result from fine droplets or finely divided solids in gas which has a high linear velocity and wherever a reduction in velocity is desired without the dispersion being diluted. A particular advantage of the process, according to the present invention, is moreover that the dispersion is produced in gaseous medium at the outlet of the subsonic diffusor having a substantially laminar flow and substantially free of turbulence with relatively slight deviation from the average velocity.

The dispersion of fine particles in gas obtained according to the present invention, has excellent properties for subsequent processing steps such as filtration, gravity sorting or magnetic separation. Metal melts which have been aerodynamically separated into fibres of metal melt, from which metal powders result which are dispersed in gas at a high velocity, may for example, be particularly advantageously subjected to the separation of particularly large or particularly fine particles of powder, after reduction of the velocity thereof according to the present invention.

An object of the present invention is also an apparatus consisting of a plurality of production apparatus for producing dispersions consisting of fine particles and gas, and a plurality of subsonic diffusers which are connected downstream, each production apparatus being connected downstream with a subsonic diffuser, and each production apparatus producing a mass flow Ṁ of the dispersion, the product of the mass flow Ṁ and the ratio of the outlet cross-section to the inlet cross section of the diffuser, being less than 10 kg per second.

The ratio of the outlet cross section to the inlet cross section of the diffuser should be more than 30, preferably more than 50. In extreme cases the ratio of the outlet cross section to the inlet cross section of the diffuser may reach values around 200.

The present invention will now be described in more detail in the following with reference to the following figures.

FIG. 1 shows an arrangement for carrying out the process according to the present invention in the nozzle blasting process for the production of mineral wool.

FIG. 2 shows a vertical cross-section through the arrangement according to FIG. 1.

FIG. 3 depicts the relative arrangement of the outlet cross-sections of the diffuser to the outlets of the fibre production apparatus.

FIG. 4 shows an enlarged view of a detail from FIG. 2.

FIG. 5 shows an example of a fibre production unit which could be used.

FIG. 6 shows in diagrammatical form, the connection between the mass flow which is supplied to a diffuser and which is dependent on the ratio of the inlet and outlet density velocities.

The top view which is depicted in FIG. 1 shows a melting pot 1 from the lower surface of which a plurality of melt flows issue entering the drawing nozzle 2 which functions according to the nozzle blasting process. Melting pot 1 and drawing nozzle 2 will be described in more detail with reference to FIG. 5. Eight diffusers 50, for example, are arranged below drawing nozzle 2. The diffusers are secured to the drawing nozzle by means of attachment parts 52 and moreover have transitional parts 51, in which the transition from the rectangular outlet of the drawing nozzle to the circular cross-section of the inlet of the diffuser is effected.

A diagrammatic view of the melting pot 1 is shown in FIG. 2, beneath which the drawing nozzle 2 in which the yet to be explained drawing-out part of the drawing nozzle is to be found. 54 denotes the outlet cross-section of the drawing nozzle 2. The attachment part 52, with which the diffuser 50 is secured to the drawing nozzle 2 is positioned below the drawing-out part. A rubber collar may be provided between the outlet cross section 54 of the drawing nozzle 2, which would prevent gas from penetrating into the drawing nozzle. The fibre dispersion 60 issues from the outlet cross section 55 of the diffusers 50 at a low velocity. Spray nozzles 64 for the binder may be provided at the outlet end between the diffusers 50. A perforated conveyor belt 62 is positioned below the diffusers 50, on to which the fibres which form the mat 61, are deposited while being drawn by suction in the direction of arrows 63. The conveyor belt moves in the direction of arrow 65.

FIG. 3 illustrates the relative arrangement of the outlet cross-sections 55 of the diffusers to the arrangement of outlet cross-sections 54 of the drawing nozzle. Two fibre formation apparatus are shown, which are divided into segments, each fibre formation apparatus having eight segments, each of which has an outlet cross-section 54. The axis 56 of the diffusor is also shown. As can be seen from FIG. 2, the axis of the diffuser is pivoted with respect to the centre plane of the drawing nozzle 2. The axis 56 pivots by means of the transitional pieces 51 which have been enlarged in FIG. 4. The curvature of the axis 56 of the transitional pieces 51 should have as large a radius as possible, so that there is no centrifugal separation of the fibres from the fibre/gas dispersion. The axis 56 of the transitional pieces 51 preferably has a radius of curvature of about 1 m. If the divergence angle of the diffusor is 7°, the pivoting may be from 5° to 7°.

The shape of the transition from the rectangular cross-section at the inlet of the transitional pieces 51 to the round cross section of the outlet is also shown.

Figure 5:
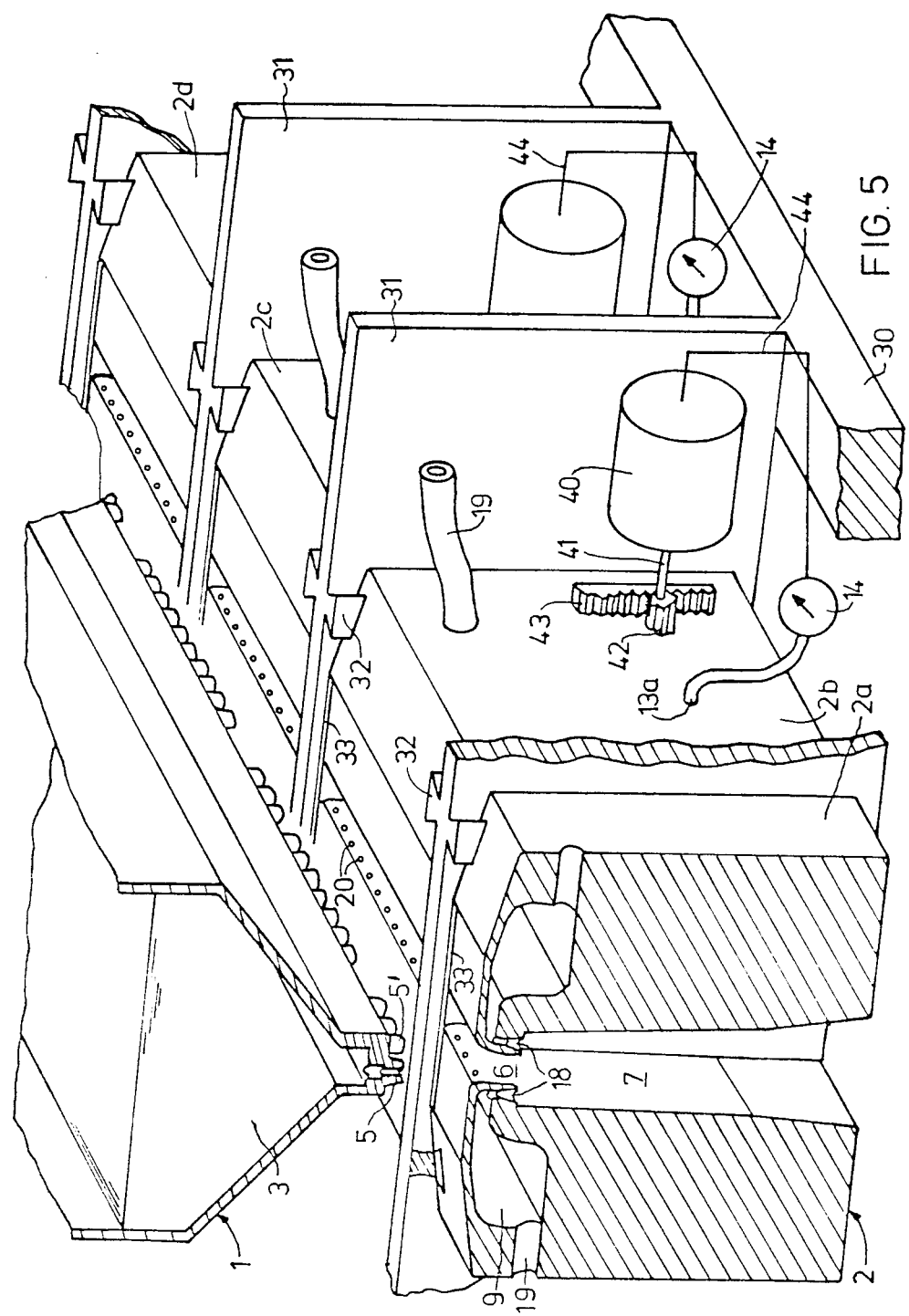
Figure 6:
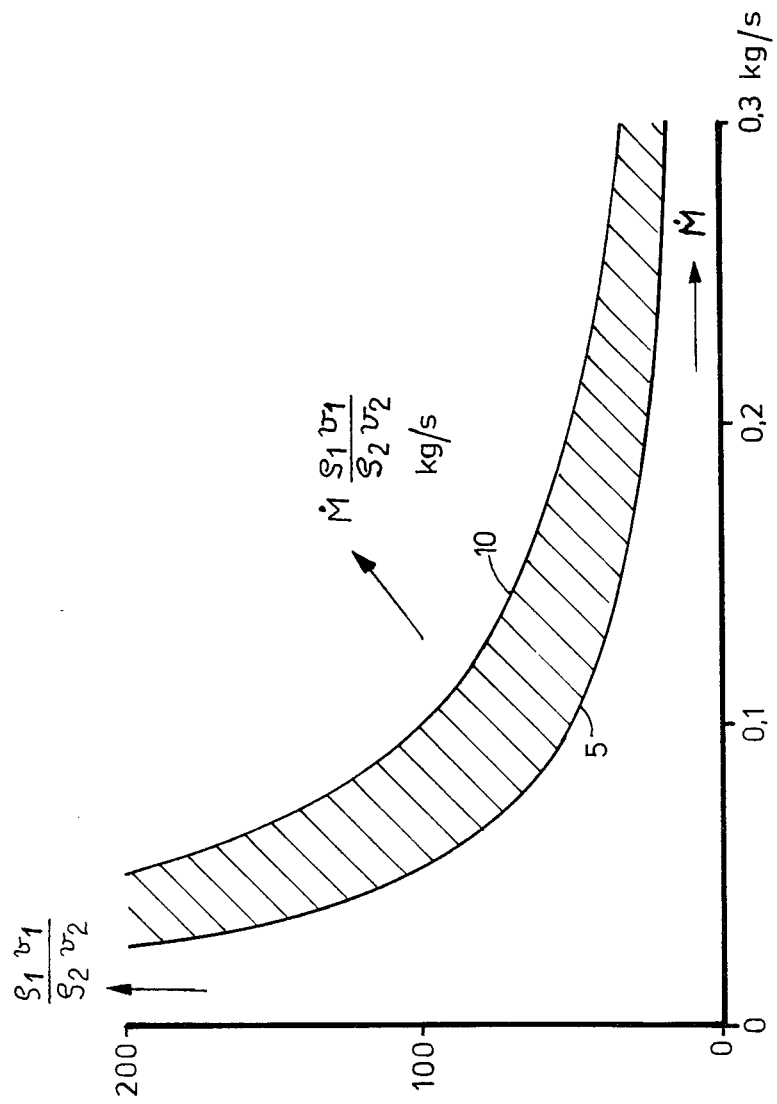

FIG. 5 shows a fibre formation apparatus according to the nozzle blasting process. A melting pot 1 contains the mineral melt 3. Melt outflow openings 5 and 5' are arranged in a staggered double row below the melting pot. The drawing nozzle 2 which consists of drawing nozzle segments 2a, 2b, 2c and 2d is positioned below the melting pot 1. The drawing nozzle segments are arranged on a carrier 30, which supports a plurality of carrier plates 31 which are vertically secured thereon. The drawing nozzle segments 2a to 2d may be individually vertically adjusted by means of dove-tail guiding devices 32, in order to adjust the distance between the upper edge of the drawing nozzle and the melt outflow openings 5, 5'. Driving motors 40 which act on a toothed rack 43 which is connected to the drawing nozzle segments by means of an axle 41 and a toothed wheel 42 are provided for this adjustment. The individual segments of the drawing nozzle are sealed to make them gas-tight with respect to the carrier plates 31 by means of sealing plates 33.

The drawing nozzle itself consists of the inlet part 6, the drawing out part 7 and propulsion jet nozzles 18 having propellant gas supply pipes 9. The propellant gas is supplied separately to each segment via supply pipe 19. In each case, a bore through the drawing nozzle in a perpendicular direction to the centre plane of the drawing nozzle is located at the lower end of the drawing-out part 7. The bore enables the gas pressure in the drawing-out part 7 to be measured by means of a connecting pipe 13a and a pressure measuring device 14. Should the gas pressure in the drawing-out part 7 deviate from a desired value, the motor 40 for adjusting the height of each nozzle segment 2a to 2d may be separately controlled via a pipe 44. Cross stream nozzles 20 are also provided, which are also supplied from the propellant gas supply pipes 9.

The jet nozzles 20, each of which is directed between two flows of melt which issue from the melt outflow openings 5 of the adjacent row, give rise to an increase in the pressure gradient in the inlet of the drawing nozzle 6. A subsonic diffusor 50 is flange mounted below the drawing nozzle 2 to each drawing nozzle segment 2a, 2b, 2c etc. by means of attachment elements 52.

EXAMPLE (a) Fibre production apparatus

A drawing nozzle is used which corresponds to FIG. 5 and has the following dimensions:
Narrowest width in the drawing nozzle inlet: d=4 mm,
Diameter of the propulsion jet nozzles: 1 mm,
Diameter at the outlet of the propulsion jet nozzles: 1.5 mm,
Width at the beginning of the drawing-out part 8 mm,
Length of the drawing-out part 80 mm,
Length of the drawing nozzle inlet in the direction of the axis: 3 mm,
Diameter of the melt overflow openings of the melting pot: 1 mm,
Total no. of nozzle nipples, which issue into the inlet nozzle segment: 26 in a double row,
Total no. of segments: 8, and
Cross section surface at the outlet of each segment: $50 \times 10.5$ mm$^2$.

The procedural parameters were as follows:
Air pressure in the propellant gas supply pipe 9 was 9.6 bars,
Gas pressure 20 mm above the drawing-out section of the drawing nozzle was 0.35 bars,
Quantity of melt issuing from each nipple of the nozzle: 14.6 g/min,
Temperature of the melt in the melting pot: 1400° C.
Velocity of the gas at the outlet of the drawing nozzle: 288 m/s
Gas pressure at the outlet of the drawing nozzle 0.74 bars,
Temperature of the gas at the outlet of the drawing nozzle: 120° C.

C-glass fibres were obtained which had an average diameter of 2.8$\mu$. The proportion of points thicker than 150$\mu$ amounted to 2.6%, by weight.

(b) Velocity reduction

The diffusers have a circular inlet cross section having a radius of from 2.6 cm which fits to the outlet of the transitional pieces 51. In each case the length thereof is 1.45 m. The circular outlet cross-section has a radius of 10 cm.

The fibre/gas dispersion which issues from the diffusers has an average velocity of 5.2 m/s and a temperature of 110° C.

(c) Mat formation

After they have issued from the diffusers, the fibres in the dispersion are sprayed with a 5% aqueous solution of a phenolformaldehyde binder. The quantity of binder was about 1%, by weight, based on the weight of the fibres.

The fibres were deposited on a perforated conveyor belt of 1 m in width, 1.5 kg/s of air being drawn off by suction below the conveyor belt over a length of 60 cm (suction area 0.6 m$^2$).

The mat had a raw density of 2.6 kg/m$^3$. After compressing the mat and hardening of the binder in a conventional hardening furnace, the mat had a density of 6 kg/m$^3$.

We claim:
1. In a process for the production of mineral wool fibers, comprising
  (a) issuing melt streams from openings in the base of a melting crucible into a converging-diverging drawing nozzle,
  (b) flowing a gaseous blasting medium into the nozzle substantially parallel to the melt stream so as to separate the melt stream into fibers, the blasting medium with the fibers dispersed therein being drawn into the nozzle by suction due to a pressure drop produced between the nozzle inlet and outlet the improvement comprising
  (c) dividing the flow of dispersion into a plurality of individual streams,
  (d) conveying the streams in parallel through a plurality of diffusers connected downstream of the nozzle to reduce the streaming velocity in each diffuser to subsonic speed,
  (e) wherein each diffuser is charged with a dispersion massflow $\dot{M}$ meeting the requirement

$$\dot{M} \cdot \frac{q_2}{q_1} < 10 \text{ kg/s},$$

wherein $q_2/q_1$ is the ratio of the outlet and inlet cross-sections of each diffuser (f) and successively collecting the decelerated fiber dispersions discharged from the diffuser outlets on a moving web.

2. The process according to claim 1, wherein the ratio $$\dot{M} \cdot \frac{q_2}{q_1}$$

is less than 8.5 kg/s.

3. The process according to claim 2, wherein the ratio $$\dot{M} \cdot \frac{q_2}{q_1}$$

is in the range of from 5 to 8 kg/s.

4. The process according to claim 1, wherein the diffusers having a widening angle of from 3.5° to 7° are used.

5. The process according to claim 1, wherein the ratio of the outlet cross-section and the inlet cross-section of each diffuser is greater than 30.

6. The process according to claim 5, wherein the ratio of the outlet cross section and the inlet cross-section of each diffuser is in the range of from 50 to 200.

7. The process according to claim 1, wherein a slit-shaped drawing nozzle which operates according to a nozzle blasting process is used as a fiber formation apparatus, the drawing nozzle is divided into individual segments and conveys to each segment of the drawing nozzle a mass flow of the fiber/gas dispersion meeting the requirement $$M \cdot \frac{q_2}{q_1} < 10 \text{kg/s},$$

ps wherein $q_1$ is the cross-section of the diffuser inlet and $q_2$ the cross-section of the diffuser outlet.

* * * * *